(12) United States Patent
Tan

(10) Patent No.: US 9,176,959 B2
(45) Date of Patent: *Nov. 3, 2015

(54) MEDIA RATING

(71) Applicant: JOOK, Inc., Carlsbad, CA (US)

(72) Inventor: Min-Liang Tan, Carlsbad, CA (US)

(73) Assignee: JOOK, INC., Carlsbad, CA (US)

( * ) Notice: Subject to any disclaimer, the term of this patent is extended or adjusted under 35 U.S.C. 154(b) by 345 days.

This patent is subject to a terminal disclaimer.

(21) Appl. No.: 13/657,427

(22) Filed: Oct. 22, 2012

(65) Prior Publication Data

US 2013/0045673 A1 Feb. 21, 2013

Related U.S. Application Data

(60) Division of application No. 11/970,016, filed on Jan. 7, 2008, now Pat. No. 8,321,449, and a continuation-in-part of application No. 11/625,692, filed on Jan. 22, 2007, now Pat. No. 7,817,960.

(51) Int. Cl.
*H04H 20/71* (2008.01)
*G06F 17/30* (2006.01)

(52) U.S. Cl.
CPC ............................. *G06F 17/30038* (2013.01)

(58) Field of Classification Search
USPC ................................................ 455/3.01–3.06
See application file for complete search history.

(56) References Cited

U.S. PATENT DOCUMENTS 7,653,761 B2 * 1/2010 Juster et al. ..................... 710/18
2007/0155307 A1 * 7/2007 Ng et al. ........................ 455/3.01

* cited by examiner

*Primary Examiner* — Fayyaz Alam
(74) *Attorney, Agent, or Firm* — Novak Druce Connolly Bove + Quigg LLP

(57) ABSTRACT

A method and system for rating media. The media is one or a combination of audio, video and textual data. The media rating method comprises surveying at least a portion of media data received from a device and detecting generation of rating data, the rating data for appraising the media data. The method further comprises transmitting the rating data to the device. The system comprises a device-readable medium having programming instructions stored therein. The instructions when executed on a first device cause the first device to survey at least a portion of media data received from a second device, detect generation of rating data and transmit the rating data to the second device.

24 Claims, 5 Drawing Sheets

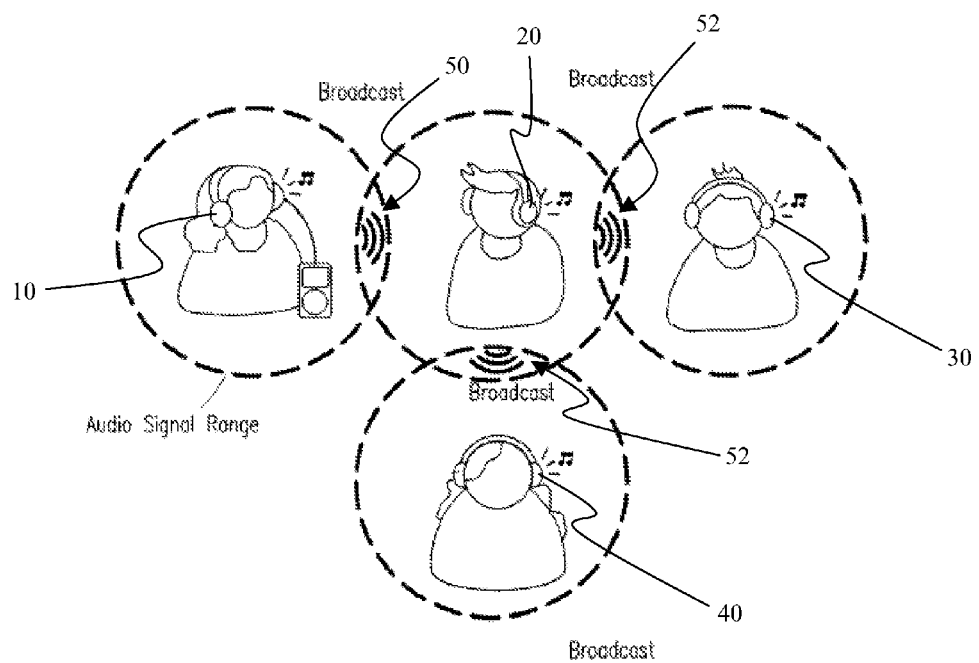

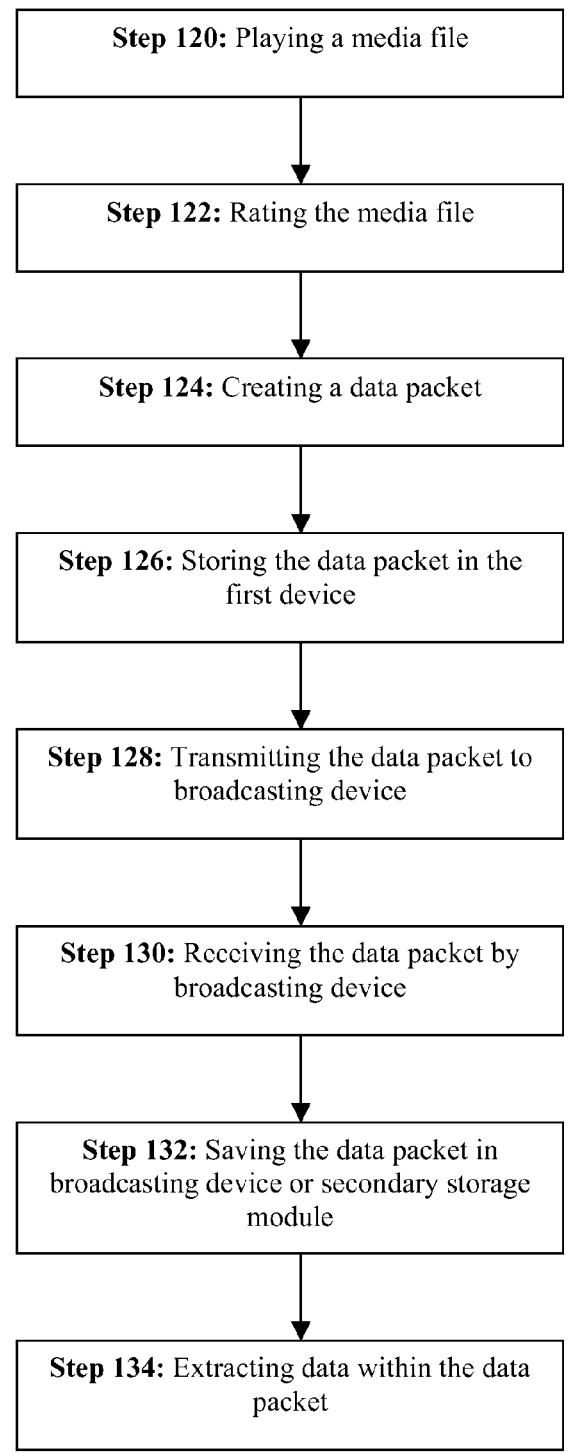

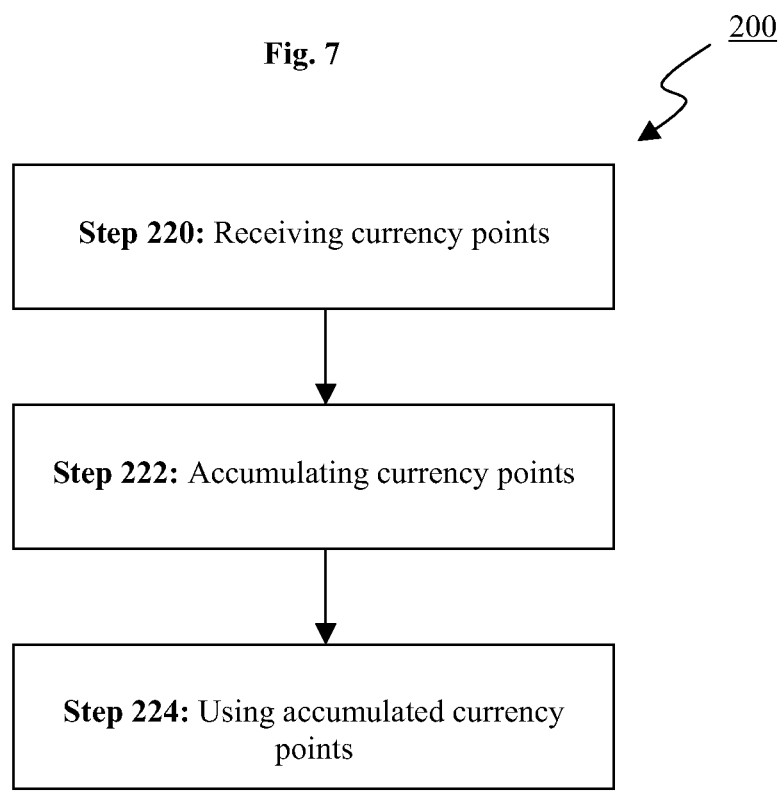

MEDIA RATING

RELATED APPLICATION

This application is a divisional of Ser. No. 11/970,016 filed Jan. 1, 2008, which is a continuation-in-part of U.S. Ser. No. 11/625,692 filed Jan. 22, 2007, and claims the benefit thereof, both cases being incorporated herein by reference.

FIELD OF INVENTION

The present invention relates generally to the field of wireless communications. More specifically, the present invention relates to wireless communication of media files and rating of such media files.

BACKGROUND

Many prior art media devices can receive media broadcasts from sources such as FM, AM and satellite broadcasts. Such a media device is able to transfer and receive media files, for example audio files, video files and audio-visual files, wirelessly between other similar media devices. The wireless transmission is performed via a variety of methods including infrared transmission, 25 mhz radio or 2.4 ghz radio transmission technologies such as Bluetooth.

Media files such as audio or visual files can originate from a variety of devices including digital media players like an Apple iPod®, a CD player or even a radio transmitting commercial radio broadcasts. Most media files in the popular MP3 and ACC formats contain identification information stored as an ID3 tag. The ID3 tag is typically contained within or associated with the audio file and is stored in a prescribed format. Identification information on the media file typically includes an artist or creator name, a title of the media file and a year of commercial release and genre of the media file.

Most media devices are able to identify the media file being played, transmitted, broadcasted and/or received. The identification of the media file can be performed by several methods. For example, the identification of the media file can be performed by extracting the ID3 tag or metadata directly from the media device that is playing, transmitting, broadcasting or receiving the media file. Alternatively, a creation of "signatures" for the audio file followed by cross-referencing of these "signatures" to a music database results in the identification of the media file. Further alternatively, the media file is identified by a user's direct input of relevant information.

The identification information on any particular media file is often limited and incomplete. Additionally, the identification information is typically static and factual in nature. There is little opportunity for a receiver of the media file to assess his potential likelihood and/or degree of enjoyment or satisfaction gained by receiving, playing, listening and/or watching the media file. There is also little opportunity for a broadcaster of media files to receive feedback regarding popularity of the media files that he has broadcasted and/or regarding degree of enjoyment conferred upon the receiver of his broadcasted media file.

Furthermore, there are limited in-built incentives for broadcasters or sharers of media files to continually increase rate of broadcasting or sharing activity and/or quality of broadcasted or shared media files.

In view of the foregoing, there is a need for a system and method for providing an indication of the potential likelihood and/or degree of enjoyment or satisfaction gained by receiving, playing, listening and/or watching any particular media file. There is also a need to increase in-built incentives aimed at broadcasters or sharers to continuously increase their broadcasting or sharing activity as well as quality of broadcasted or shared media files.

SUMMARY

In accordance with a first aspect of the invention, there is disclosed a media rating method comprising surveying at least a portion of media data receivable from a device, the media data comprising at least one of audio, video and textual data. The media rating method further comprises detecting generation of rating data, the rating data for appraising the media data. The media rating method also comprises transmitting the rating data for reception by the device.

In accordance with a second aspect of the invention, there is disclosed a device-readable medium having stored therein a plurality of programming instructions, which when executed on a first device, the instructions cause the first device to survey at least a portion of media data receivable from a second device, the media data comprising at least one of audio, video and textual data. The plurality of programming instructions, which when executed on the first device, the instructions further cause the first device to detect generation of rating data, the rating data for appraising the media data and to transmit the rating data for reception by the second device.

In accordance with a third aspect of the invention, there is disclosed a media rating system comprising means for surveying at least a portion of media data receivable from a device, the media data comprising at least one of audio, video and textual data. The media rating system further comprises means for detecting generation of rating data, the rating data for appraising the media data and means for transmitting the rating data for reception by the device.

In accordance with a fourth aspect of the invention, there is disclosed a media rating method comprising broadcasting media data receivable by a plurality of devices, the media data comprising at least one of audio, video and textual data. The media rating method further comprises receiving at least one rating score from at least one of the plurality of devices, the at least one rating score being associated with the media data for appraisal thereof. The media rating method also comprises capturing the least one rating score as rating data.

BRIEF DESCRIPTION OF DRAWINGS

Embodiments of the invention are described hereinafter with reference to the following drawings, in which:

FIG. 5 illustrates another embodiment of the invention in which a plurality of broadcasts occurs, and in which differing audio signals and related information may be communicated among the various devices;

FIG. 6 illustrates a method for rating a media file being played by a device, broadcasted to the device, transmitted by the device or received by the device; and FIG. 7 illustrates a "currency" rating method executable by the device of FIG. 6.

DETAILED DESCRIPTION

With reference to the drawings, preferred embodiments of the invention for providing a system and a method for rating of a media file as well as applications thereof are described hereinafter.

Systems and methods for transmitting media files and their related information are known in the art. Media files can be one or a combination of audio data, video data and textual data. Related information of a media file is transmitted as metadata, usually as a header or a footer of the media file. Related information can include a title of the media file, an artist of the media file and a size of the media file. However, the metadata is often restricted to static and factual data. That is to say, the metadata typically does not comprise information regarding the media file that is variable or inconsistent in nature. For example, the metadata presently do not comprise an indication of current popularity of the media file. A user of a media device that receives and plays the media file is at present neither able to rate the media file nor able to supply or transmit the rating as part of the metadata. The present invention therefore provides a system and a method for rating a media file and for sharing the rating between media devices and their users.

For purposes of brevity and clarity, description of the invention is limited hereinafter to media devices capable of broadcasting, receiving, transmitting or playing a media file. This however does not preclude various embodiments of the invention from other applications that require a similar operating performance. Functional and operational principles upon which embodiments of the invention are based on remain the same throughout the various embodiments.

The device is preferably a standalone device which can include media (for example, audio and video) playback, telecommunication or personal digital assistant (PDA) functionalities. Alternatively, the device is a dongle couplable to a media device, a telecommunication device, a PDA or a similar device.

Dedicated and Broadcast Use

Figure 1:
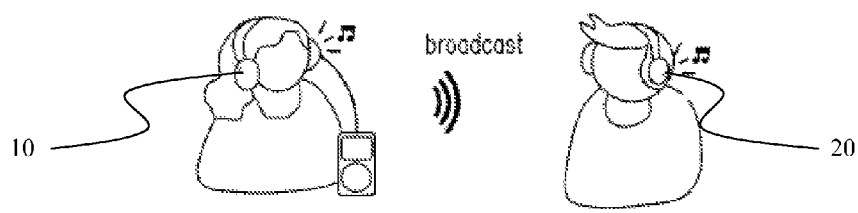
FIG. 1 illustrates a schematic view of a person sharing media and related information in accordance with one aspect of the present invention.

As shown in FIG. 1, the user of a first device 10 can opt to only transmit a dedicated signal from the first device to a second device 20; in this instance, the second device 20 will be the only receiving device for the first device 10. The second device 20 decodes the signal from the first device 10 to provide the user of the second device 20 with the appropriate/desired media.

As used herein, the term "dedicated" is used to refer to a closed network, whereby only users of that network may have ready access to the decoding and/or decrypting technology to access the communicated signals. A "closed network can refer to a network that employs proprietary technology that is not directly interoperable with other standards-based networks, or that adds an additional layer of encoding onto standards-based networks. A "closed network" also encompasses a private network that can only be used by authenticated or authorized devices; e.g. outsider use may be prohibited and enforced through cryptographic means. A closed network is thus distinct from an open network such as Bluetooth, whereby any device that is Bluetooth-enabled may (in the absence of proprietary encoding or encryption) receive and process that signal.

Information relating the media file may also be encrypted to provide a further layer of security to information communication between devices. Encryption can be used to secure information communications and stored information. Digital communications accommodate the use of encryption. As consumers continue to move from wireline to wireless communications devices, the use of encryption has become more important to the end user in some contexts.

Figure 2:
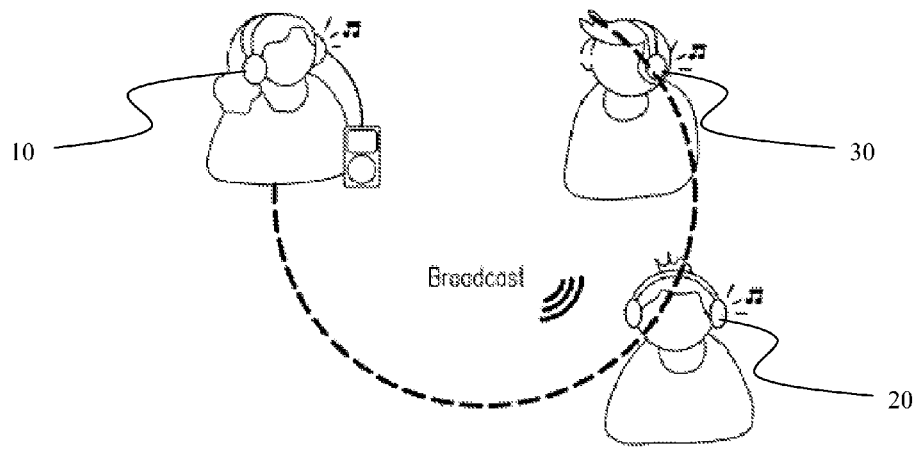
FIG. 2 illustrates a schematic view of a plurality of persons sharing media (and data) from a single source in accordance with one aspect of the present invention.
Figure 3:
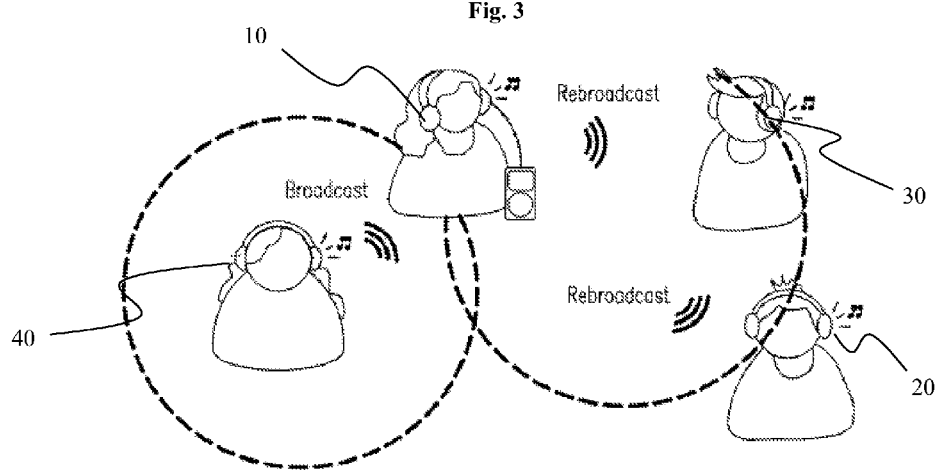
FIG. 3 and FIG. 4 illustrate other embodiments of the invention in which a plurality of rebroadcasts occur.

Referring now to FIG. 2, a user of the first device 10 can opt to set the first device 10 to broadcast. As such, enabled third parties in the range of transmission of the first device 10, such as the user of a third device 30 and potentially others, can opt to set their respective devices to receive from the first device 10, or on a channel on which the first device 10 is set to transmit. The third device 30 and others can now decode the signal from the first device 10 to provide the user of the third device 30 and some others with the appropriate/desired media file. As shown in FIG. 3, the user of the first device 10 can also opt to set the first device 10 to receive from other transmitting devices (e.g. a fourth device 40) belonging to other users.

Rebroadcasting

Figure 4:
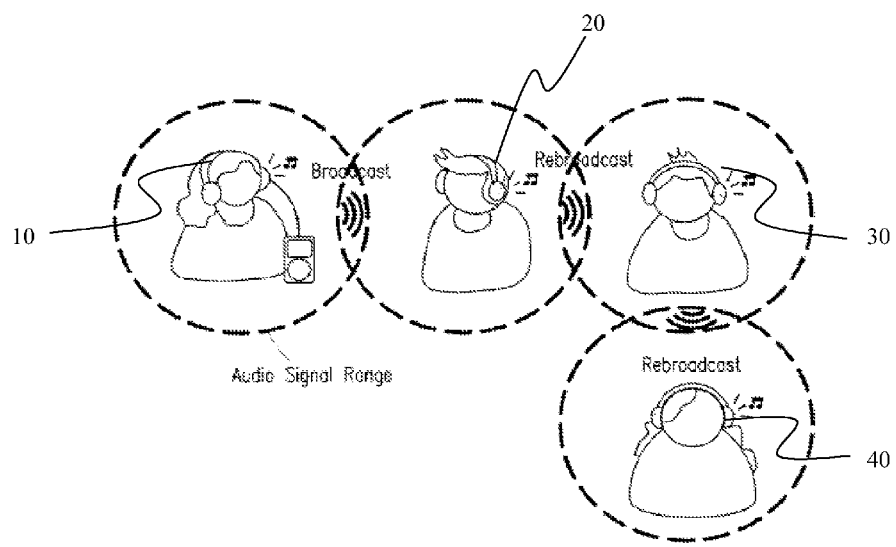

The system and method of the present invention can also be used in the context of re-broadcasting. For example, as shown in FIG. 4, with the user can set the first device 10 on broadcast, the user of the second device 20 which is receiving the media file can opt to set the second device 20 to receive the media file from the first device 10 and to simultaneously re-broadcast the same media file to other users' devices (for example, the third device 30 and the fourth device 40). Alternatively, the second device 20 can simultaneously receive the media file from first device 10 as well as transmit media files already stored within the second device 20 to other users' devices.

Rebroadcasting may be undertaken before or after decoding the signals; if the latter, the signals will be encoded prior to being retransmitted. The encoding may be the same as, or in some applications different from, the original encoding.

Rebroadcasting thus allows user of a device who is out of the range of the first device 10 but in the range of the re-broadcast of 20 to receive the appropriate media file from the first device 10 via the second device 20. Likewise, if the user of the third device opts to set the third device 30 to re-broadcast, the user of the fourth device 40, who is out of the range of the broadcast of the first device 10 and the rebroadcast of the second device 20, can opt to set the fourth device 40 to receive the appropriate media file from the first device 10 via the second device 20 and the third device 30. For all the applications above, the users of the second device 20, the third device 30 and the fourth device 40 can also set their respective devices to receive the appropriate media files which are being re-broadcasted.

FIG. 5 depicts an alternative embodiment of the invention that enables use with the simultaneous reception and transmission/broadcast of different media files. As shown in FIG. 5, the user of the first device 10 can set the first device 10 to transmit or broadcast a certain signal 50. The user of the second device 20 can set his device to receive the transmission/broadcast of the certain signal 50 from the first device 10. The user of the second device 20 can simultaneously opt to set the second device 20 to transmit or broadcast a different signal 52 on a different channel which can be received by users of, for example, the third device 30 and the fourth device 40 provided that they have set their respective devices to receive the transmission or broadcast of the different signal 52 on that channel from the user of the second device 20.

The setting of the device to receive, to transmit or to simultaneously transmit and receive can be selected manually by the user of the device by operating a user interface formed on the device. Alternatively, the setting of the device to receive, to transmit or to simultaneously transmit and receive is performed automatically upon detection of signals from another device.

The invention also enables use in multi-channel transmission or broadcast (simultaneous or otherwise). With multiple users transmitting in a limited range, the implementation of the wireless transmission may be made un-dedicated channels which users may opt to receive either:
- automatically via hunting and/or frequency hopping; or
  i. manually by tuning to specific frequencies denoted by:
  a. discrete channels denoted by numbers (e.g. Channel 1, Channel, etc);
  b. discrete channels denoted with colors (e.g. Red, Green, Blue); or
  c. other methods consistent with those known to persons of skill in the art.

In order to identify the mode in which a device is operating (transmitting, broadcasting, re-broadcasting or receiving), the user of a device can opt to set either cues on his device or cues to be displayed/received on third parties' device to allow third parties to identify the mode in which a device is operating. The cues could take various forms or combination of forms such as:
- a. visual cues, including text, colored indicators or lights, which will indicate the various modes in which the device is operating; and
- b. sound cues which will indicate the various modes in which the device is operating. Such sounds can either be heard audibly or through use of the device.

(E.g., the first device 10 is set to broadcast. The first device 10 flashes a blue light which users of other Devices (e.g. the second device 20 and the third device 30) can see and then opt to set the second device 20 and the third device 30 to receive the first device's broadcast.)

Media File Rating

In a preferred embodiment of the present invention, the user of the first device 10 is able to give a rating to a media file that is played, broadcasted thereto, transmitted or received by the first device 10. The media file can be an audio track or an audio song. Alternatively, the media file is an audio-visual file. The rating given to the media file preferably reflects a degree to which the user of the first device 10 enjoys the media file. Alternatively, the rating reflects a perceived quality or value of the media file.

The user of the first device 10 rates the media file being played, broadcasted thereto, received or transmitted via a method 100. The first device 10 first plays the media file in a step 120. The media file that is played is preferably broadcasted to the first device 10 from a broadcasting device. Alternatively, the media file being played is received from other similar devices, for example the second device 20 or the third device 30. Further alternatively, the media file being played is already stored within a memory module of the first device 10.

In a step 122, the user of the first device 10 operates a user interface formed on the first device 10 for generating a rating for the media file being played. Preferably, the user interface is a touch screen. Alternatively, the rating is entered into the first device 10 via a keypad. The ratings may be entered in a traditional form, for example providing a number or rating from one to ten, a percentage, a percentile, or number of one to five or ten stars (or other iconography).

The generated rating is captured by the first device 10 in a data packet in a step 124. The creation of the data packet can be performed automatically upon entry of the rating. Alternatively, the user of the first device 10 controls or authorizes the creation of the data packet. Preferably, the data packet further comprises data or information on the media file that is being played and rated. The data includes, but is not limited to, a title of the media file, a composer or artiste of the media file, a unique identifier of the media file, a hash code of the first device 10 and a time-stamp for indicating rating entry.

Preferably, the data packet is stored in the memory module of the first device 10 in a step 126. The user of the first device 10 can access the memory module as and when desired to thereby review the media file's previously given rating and data. This enables the user of the first device 10 to recall all his previously given ratings, and corresponding enjoyment of the media file, together with data on the media files. Consequently, the user of the first device is 10 able to easily recall, find and/or replay previously enjoyed media files.

Ability of users of devices to rate media files and then store these ratings together with data on the corresponding media files solves a common problem in FM radio broadcasts wherein users enjoy a particular media file but misses or forgets the particular media file identity. With the present invention, the particular media file is rated and the rating together with data on the particular media file is stored for subsequent retrieval and recall.

In a step 128, the data packet is wirelessly transmitted back to the broadcasting device. The broadcasting device then receives the data packet in a step 130. The data packet is then saved in a step 132. Preferably, the data packet is saved in a memory module of the broadcasting device. Alternatively, the data packet is transferred to and stored in a secondary storage module. The secondary storage module can be an external storage device. Alternatively, the secondary storage module is an Internet database or a software program.

The user of the broadcasting device (hereinafter referred to as a broadcaster) extracts or accesses the data or information stored within the data packet in a step 134. The data is used for a variety of different purposes. For example, the broadcaster is able to consolidate and analyze ratings given to broadcasted media files, thereby assessing relative popularity of broadcasted media files. If the broadcaster is broadcasting a self-composed media file, for example an audio song, receiving data packets that comprises ratings on the self-composed media file gives the broadcaster valuable feedback as to degree of enjoyment, if at all, that others, for example the user of the first device 10, derive from playing, listening to and/or watching the self-composed media file.

A profile of the user of the first device 10 is optionally stored in the memory module of the first device 10. Preferably, the user profile is incorporated into the data packet created and transmitted together with associated media file rating and data to the broadcasting device. Further preferably, the transmitted user profile is stored in the memory module of the broadcasting device or in the secondary storage module together with its corresponding rating and data on the media file.

The first device 10 preferably comprises Global Positioning System (GPS) functionalities. The GPS functionalities enable the first device 10 to derive UPS coordinates to reflect its physical location. Preferably, the GPS coordinates of the first device 10 are incorporated into the data packet created in the step 124 and are transmitted together with associated media file rating and data to the broadcasting device.

The broadcasting device typically receives a large number of data packets from multiple devices, including the first device 10, the second device 20 and the third device 30. For example, at least one hundred, at least one thousand, at least one hundred thousand, at least one million or at least ten million devices provides or transmits data packets, with ratings comprised therein, to the broadcasting device. The data packets received can be stored in the memory module of the broadcasting device or in the secondary storage module.

Preferably, the data within the data packets that are received from the many devices can be aggregated and statistically analyzed by a software program or Internet website.

The broadcaster is able to analyze the ratings of different media files to assess relative popularity and users' preferences regarding the different media files. Furthermore, the broadcaster is able to cross-reference between user profiles and the relative popularity and users' preferences regarding the different media files. The statistical analysis of the ratings further enables the broadcaster to obtain information such as a mean, a median and a standard deviation of user ratings for any particular media file as well as for a selected group of media files.

Ability to aggregate, statistically analyze and evaluate given ratings to media files enables broadcasters to specifically tailor their broadcasted media files to better suit or match individual device users' preferences. The ability to aggregate, statistically analyze and evaluate the given ratings to media files also allows composers to hone or refine their media or musical content so as to provide users or listeners with an enhanced degree of enjoyment.

The data packets together with the aggregated and statistically analyzed data are optionally displayed on the Internet. Alternatively, the data packets together with the aggregated and statistically analyzed data are stored on a software program. The data packets and the aggregated and statistically analyzed data can be made accessible to all members of the public. Alternatively, access to the data packets and the aggregated and statistically analyzed data is controlled, for example, password restricted or restricted via device type or identity.

In a preferred embodiment of the present invention, the first device 10 comprises the functionalities of the broadcasting device.

"Currency" Rating

In a preferred embodiment of the present invention, the first device 10 is able to execute a "currency" rating method 200. The "currency" rating method 200 is preferably performed in conjunction with the method 100. Alternatively, the "currency" rating method is performed independently from the method 100.

In a step 220 of the method 200, the first device 10 receives currency points. The first device 10 then accumulates a pool of currency points in a step 222. Currency points can also be known as credit. As such, number of currency points is also known as credit amount. The accumulation of currency points can occur as a function of time, for example an addition of one or more currency points into the pool every one or a given alternative number of days. Alternatively, the first device 10 receives currency points from another device, for example the second device 20 or the third device 30.

In the latter alternative scenario wherein the first device 10 receives currency points from another device, the first device 10 first transmits or broadcasts a media file to the second device 20. The second device 20 then performs steps 120, 122, 124 and 128 of the method 100. One or more currency point is then transmitted together with the data packet from the second device 20 to the first device 10. The number of currency points transmitted from the second device 20 to the first device 10 is preferably dependent on rating given by the user of the second device 20 on the media file that is transmitted or broadcasted from the first device 10 to the second device 20. Therefore, the number of accumulated currency points of the first device 10 provides a reflection as to popularity of media files transmitted or broadcasted by the first device 10. The accumulated currency points also provides a reflection as to activeness of transmission or broadcasting of media files by the user of the first device 10.

Preferably, there is a maximum limit on the number of currency points that the first device 10 is able to accumulate. The maximum limit is for example twenty, fifty, one hundred, one thousand or ten thousand currency points. Once the maximum limit is reached, the first device 10 may not be able to receive additional currency points.

The user of the first device 10 uses the accumulated currency points in a step 224. The accumulated currency points can be used for a variety of purposes. For example, the accumulated currency points can be used to rate media files played, received by or broadcasted to the first device 10. Preferably, the number of currency points used by the user of the first device 10 is proportionately indicative of the rating that he gives to the media file being played, received or broadcasted.

Alternatively, the accumulated currency points can be exchanged for tangible or even financial returns or benefits. The fact that the currency points are expandable and can only be replenished at a known rate or limited manner confers upon the currency points a perceived intrinsic value.

Ability to accumulate currency points allows for various recognition and reward systems. Such recognition and reward systems can be perceived or tangible. For example, an "achievement" list could be displayed, the list indicative of activeness of broadcasters or popularity of broadcasters (for example, top ten broadcasters having a highest mean rating for their broadcasting media files). Additionally, a tangible prize or reward can be given to broadcasters who top such "achievement" lists.

The accumulated currency points or credit amount can be displayed on a network accessible site. The network accessible site is preferably publicly accessible. As previously mentioned, the number of currency points or credit amount can be indicative of activeness of broadcasters. That is to say, currency points or credit amount can increase in response to increased activity of the broadcaster. As also previously mentioned, the number of currency points or credit amount can also be indicative of the ratings given to broadcasted media files. That is to say, currency points or credit amount can increase in response to increased ratings given to the broadcasted media files by the first device 10.

In the foregoing manner, a system and method for media rating as well as various applications thereof are described according to exemplary embodiments of the invention for addressing the foregoing shortcomings of media sharing experiences. This system and method can also apply to other types of data stored on the device and even data or information regarding users of the device. Although only embodiments of the invention are disclosed, it will be apparent to one skilled in the art in view of this disclosure that numerous changes and/or modifications can be made without departing from the scope and spirit of the invention.

The invention claimed is:

1. A media rating method comprising:
providing a plurality of devices each configured for broadcasting, receiving and playing media data;
broadcasting media data from a first device of the plurality of devices to at least a second device of the plurality of devices, at least a portion of the media data comprising at least one of audio, video, and textual data;
generating at least one rating score by at least the second device of the plurality of devices, the rating score indicating how well the media data was liked;
generating at least one rating credit amount corresponding to the least one rating score;
generating a data packet by at least the second device of the plurality of devices, the data packet comprising the rating score and the rating credit amount;

transmitting the data packet from at least the second device of the plurality of devices to the first device; and saving the transmitted data packet in a storage module.

2. The method as in claim 1, wherein the storage module is located on any of the first device and an external storage module.

3. The method as in claim 2, wherein the external storage module is any of an external storage device, a software program on a host computer and an Internet database.

4. The method as in claim 1, further comprising receiving a plurality of data packets from the plurality of devices and saving the received data packets in the storage module.

5. The method of claim 4, further comprising aggregating and analyzing data in the received data packets with a software program.

6. The method of claim 5, wherein analyzing the data comprise statistical analysis of the rating score comprising obtaining any of a mean, a median and a standard deviation of rating scores of media data.

7. The method of claim 5, further comprising cross-referencing user profile data in the received data packets with rating scores regarding different media files.

8. The method of claim 5, further comprising cross-referencing location data in the received data packets with rating scores regarding different media files.

9. The method of claim 4, further comprising displaying data from the received data packets on the Internet, and wherein the displayed data comprises aggregated and analyzed data.

10. The method of claim 9, wherein the aggregated and analyzed data is made accessible to the public through customized restrictions.

11. The method of claim 4, comprising accumulating a count of the rating credit amount of a user.

12. The method of claim 11, comprising providing a reward system wherein accumulated rating credit is exchanged for a tangible reward.

13. The method of claim 11, comprising displaying the accumulated count of the user's rating credit amount on the Internet.

14. A device-readable non-transitory medium having stored therein a plurality of programming instructions, which when executed on a first device of a plurality of devices configured for broadcasting, receiving and playing media data, the instructions cause the first device to:

broadcast media data to at least a second device of the plurality of devices, at least a portion of the media data comprising at least one of audio, video and textual data;

receive a data packet from at least the second device of the plurality of devices, the data packet comprising:

at least one rating score indicating how well the media data was liked; and at least one rating credit amount corresponding to the at least one rating score; and save the received data packet in a storage module.

15. The device-readable non-transitory medium as in claim 14, wherein the plurality of programming instructions, which when executed, cause the first device further to:

receive a plurality of data packets from the plurality of devices and saving the received data packets in the storage module.

16. The device-readable non-transitory medium as in claim 15, wherein the plurality of programming instructions, when executed, cause the first device further to:

aggregate and analyze data in the received data packets with a software program.

17. The device-readable non-transitory medium as in claim 15, wherein the plurality of programming instructions, when executed, cause the first device further to:

display data from the data packets on the Internet, wherein the displayed data comprises aggregated and analyzed data.

18. The device-readable non-transitory medium as in claim 15, wherein the plurality of programming instructions, when executed, cause the first device further to:

accumulate a count of the rating credit amount of a user; and display the accumulated count of the user's rating credit amount on the Internet.

19. A media rating system comprising:

a plurality of devices each configured for broadcasting, receiving and playing media data;

means for broadcasting media data from a first device of the plurality of devices to at least a second device of the plurality of devices, at least a portion of the media data comprising at least one of audio, video and textual data;

means for generating at least one rating score by at least the second device of the plurality of devices, the rating score indicating how well the media data was liked;

means for generating at least one rating credit amount corresponding to the at least one rating score;

means for generating a data packet by at least the second device of the plurality of devices, the data packet comprising the rating score and the rating credit amount;

means for transmitting the data packet from at least the second device of the plurality of devices to the first device; and saving the transmitted data packet in a storage module.

20. The system as in claim 19, wherein the storage module is located on any of the first device and an external storage module; and wherein the external storage module is any of an external storage device, a software program on a host computer and an Internet database.

21. The system as in claim 19, further comprising:

means for receiving a plurality of data packets from the plurality of devices and saving the received data packets in the storage module.

22. The system as in claim 21, further comprising:

means for aggregating and analyzing data in the received data packets with a software program.

23. The system as in claim 21, further comprising:

means for displaying data from the data packets on the Internet, and wherein the displayed data comprises aggregated and analyzed data.

24. The system as in claim 23, wherein the means for displaying data from the data packets on the Internet further comprises:

means for making the aggregated and analyzed data accessible to the public through customized restrictions.

\* \* \* \* \*